Aug. 13, 1929.  J. A. HYLE  1,724,595
SPRING NUT LOCK WASHER
Filed Feb. 4, 1928
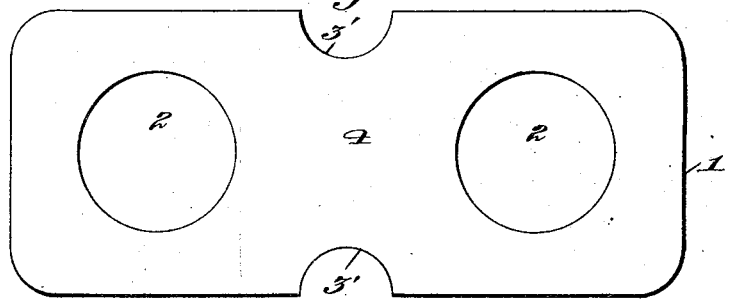
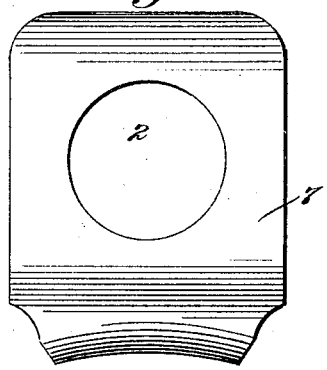
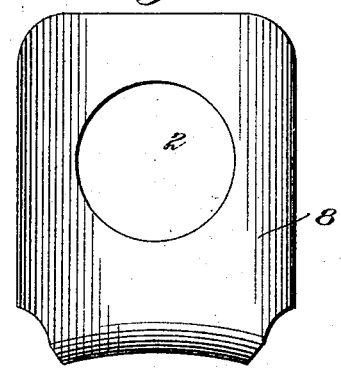
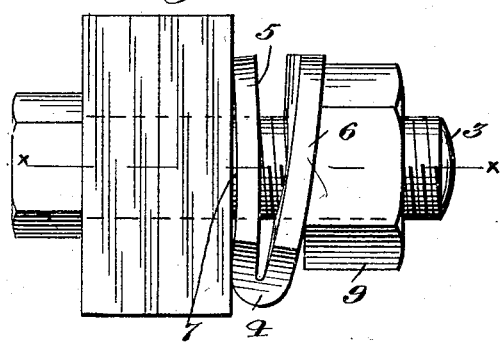
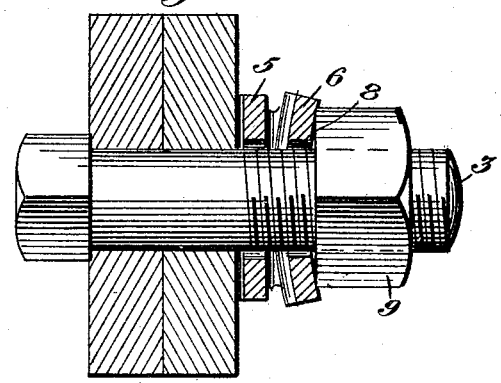
Inventor:
Jacob H. Hyle,
By Jas. L. Skidmore
his Att'y.

Patented Aug. 13, 1929.

1,724,595

UNITED STATES PATENT OFFICE.

JACOB A. HYLE, OF ATLANTIC CITY, NEW JERSEY.

SPRING-NUT-LOCK WASHER.

Application filed February 4, 1928. Serial No. 251,944.

This invention pertains to an improved and novel spring nut lock washer and is so constructed that when the securing nut is adjusted in contact with the washer to the usual degree of tightness in order to properly fasten it in place, there remains some spring to the said washer, hence when the rail and rail joint to which it may be attached expand from heat the bolt will not stretch, since the spring will yield under the strain of expansion, and when the joint contracts the counter resistance of the device will be so great that the joint or any other device to which it is secured will return to its original set condition due to the intense strength of this spring lock washer.

The main object of the invention is to provide a simple, durable, economical and thoroughly efficient spring nut lock washer from a single piece of suitable metal, adapted to effectively prevent the nut from loosening or unscrewing when subjected to undue strains and vibrations of various kinds.

Another object of the invention is to so construct my novel washer from a single piece of spring steel made in bars and rolled to the desired width and size, then heated punched out and the bar folded upon itself centrally of its length to form what may be properly termed a double nut lock in one piece formed with an upper and lower portion of equal dimensions, the lower member being concaved or curved from its inner to its outer end with relation to its length and the outer member being concaved or curved from one side to the other with relation to its width, so that when a nut is securely and tightly applied it will cause the lower face of the washer to be flattened out, and when the nut is removed it will spring back to its normal curvature and shape, the steel being of such qualitiy that it will assume its normal shape, thus furnishing the desired spring resistance against the nut under all conditions, so that all wear will be properly taken up as well as the slack caused by stretching the bolt.

It is well known in the art that when the railway trackmen apply the securing nuts to a railway joint they do not stretch the bolt, but when the ordinary washer is used all of its spring is exhausted, hence when there is no spring action left expansion stretches the bolt and the washer will not take up the loose space or slack, while by the use of my improved washer, when the bolt stretches the washer will spring back to its normal shape, thus taking up all slack, and holding the nut firmly at any position it may have assumed.

The foregoing and such other objects as may apear from the ensuing description are accomplished by the construction, arrangement, and location of my improved washer hereinafter more fully described, illustrated by the accompanying drawings, and particularly pointed out in the claims appended hereto, it being understood that slight changes in the precise shape proportions and minor details of construction may be resorted to without departing from the spirit or sacrificing any of the advantages of the invention.

In the accompanying drawings forming a part of this specification, it will be seen that:—

Figure 1 is a plan view of a blank bar of steel from which the washer embodying my invention is properly formed.

Figure 2 is a plan of the lower face of the washer when formed and ready for use.

Figure 3 is a similar view of the upper or outer face of the washer.

Figure 4 is a side elevation showing the washer applied to a bolt, and showing the condition of the washer before the nut is tightly secured in contact therewith, and Figure 5 is a section taken in the plane of the dotted lines $x$—$x$, Fig. 4.

In the embodiment of my invention as illustrated it will be seen that in Fig. 1 the numeral 1 designates a bar of suitable dimensions formed from a single piece of high carbon spring steel, hot rolled, or cold drawn, with opening 2 punched therethrough for the reception of a bolt 3, and centrally of each side of the said bar a substantially semi-circular piece 3' is cut out, so that the bar may be more readily bent upon itself from its middle or central portion 4 so as to form what may be termed a double washer, that is, a washer composed of a lower member 5 and an upper member 6, said lower member being formed with a concaved, dished or curved lower face 7 lengthwise thereof, and extending from its inner to its outer end, while the upper member is formed with a concaved, dished or curved upper face 8, extending from one side thereof to its opposite side throughout its width.

It will be perceived that when the securing nut 9 is screwed tightly against the washer under sufficient pressure it will cause its lower face to flatten out, hence its high spring resistance will be exerted to maintain the nut in tight contact with the threads of the bolt 3, and when the nut is loosened it will spring back into the position, such as is shown in Fig. 4 of the drawings, to its normal formation.

It will also be observed that when the nut is tightly adjusted in its locked position in contact with the outer and upper face of the washer, the nut, regardless of whether it is a square nut or of hexagonal form, the lower face of the nut will rest upon the inwardly dished or curved face of the washer, as clearly shown in Fig. 5, which formation securely prevents the nut from turning in either direction, thereby preventing the nut from loosening, while the spring resistance of the upper member during its compression by the nut exerts sufficient pressure to maintain the nut in locked position in contact with the threads of the bolt under any and all conditions of service.

Since this washer is made from a single piece folded upon itself with an upper and lower member and the members being spaced apart with a lengthwise dished lower face and a sidewise dished upper face it will be readily evident that both members jointly contribute to maintain the nut in a securely locked position.

It will be readily obvious that this particular shape and formation of washer can be cold punched, hot punched or forged, or otherwise formed in any suitable or desirable manner.

Having thus described my invention, what I claim and desire to secure by Letters Patent is:

1. A spring nut lock washer formed from a bar of spring steel inwardly folded centrally upon itself and formed with a sidewise dished or curved upper member and a lengthwise inwardly dished or curved lower member.

2. A spring nut lock washer formed from a single bar of steel having an upper and a lower member, the lower face of the lower member being inwardly dished or curved lengthwise and the upper face of the upper member being sidewise inwardly curved or dished.

3. A spring nut lock washer formed from a single piece of steel having an upper and a lower member spaced apart, the upper face of the upper member being inwardly dished or curved from one side to the other, and the lower face of the lower member being inwardly dished or curved lengthwise thereof.

4. A spring nut lock washer formed from a single piece of high grade spring steel bent centrally thereof to form an upper and a lower member, the lower face of the lower member being inwardly dished or curved lengthwise thereof, and the upper face of the upper member being inwardly dished or curved with relation to its width.

5. A spring nut lock washer formed from a single bar of spring steel with a piece cut out of said bar at each side of its central portion, and folded centrally upon itself to form an upper and a lower member spaced apart, the lower face of the lower member being inwardly curved or dished lengthwise, and the upper face of the upper member being inwardly dished or curved with relation to its width.

JACOB A. HYLE.